US005614088A

United States Patent [19]
Nagai et al.

[11] Patent Number: 5,614,088
[45] Date of Patent: Mar. 25, 1997

[54] CLEANING WATER PRODUCTION SYSTEM

[75] Inventors: Hiroshi Nagai; Yukio Ikeda; Takayuki Saito, all of Kanagawa-ken, Japan

[73] Assignee: Ebara Corporation, Tokyo, Japan

[21] Appl. No.: 664,312

[22] Filed: Jun. 11, 1996

Related U.S. Application Data

[63] Continuation of Ser. No. 361,162, Dec. 21, 1994, abandoned, which is a continuation of Ser. No. 66,304, May 24, 1993, abandoned.

[30] Foreign Application Priority Data

May 28, 1992 [JP] Japan ..................... 4-160091

[51] Int. Cl.$^6$ ....................................... C02F 1/42
[52] U.S. Cl. .................. 210/188; 210/259; 210/266; 210/195.1; 210/143
[58] Field of Search ..................... 210/259, 900, 210/760, 266, 257.1, 257.2, 202, 195.1, 195.2, 98, 109, 110, 143, 748, 664, 669, 188

[56] References Cited

U.S. PATENT DOCUMENTS

| | | | |
|---|---|---|---|
| 3,774,763 | 11/1973 | Yall et al. | 210/259 |
| 3,870,033 | 3/1975 | Faylor et al. | 219/316 |
| 4,179,373 | 12/1979 | Sablich et al. | 210/98 |
| 4,280,912 | 7/1981 | Berry, III et al. | 210/266 |
| 4,470,911 | 9/1984 | Reinke | 210/98 |
| 4,548,716 | 10/1985 | Boeve | 210/669 |
| 4,595,498 | 6/1986 | Cohen et al. | 210/258 |
| 4,622,133 | 11/1986 | Furuno | 210/900 |
| 4,698,153 | 10/1987 | Matsuzaki et al. | 210/266 |
| 4,784,763 | 11/1988 | Hambleton et al. | 210/195.2 |
| 4,784,772 | 11/1988 | Gotoh et al. | 210/266 |
| 4,808,287 | 2/1989 | Hark | 210/259 |
| 5,024,766 | 6/1991 | Mahmud | 210/266 |
| 5,068,030 | 11/1991 | Chen | 210/266 |
| 5,073,268 | 12/1991 | Saito et al. | 210/760 |
| 5,082,557 | 1/1992 | Grayson et al. | 210/109 |
| 5,106,503 | 4/1992 | Ohmi et al. | |
| 5,124,033 | 6/1992 | Ohmi et al. | 210/257.1 |
| 5,128,043 | 7/1992 | Wildermuth | 210/900 |
| 5,160,429 | 11/1992 | Ohmi et al. | 210/900 |
| 5,259,972 | 11/1993 | Miyamaru et al. | 210/900 |

FOREIGN PATENT DOCUMENTS 0433893 6/1991 European Pat. Off. .
63-108724 5/1988 Japan .

*Primary Examiner*—Cynthia L. Nessler
*Attorney, Agent, or Firm*—Armstrong, Westerman, Hattori, McLeland & Naughton

[57] ABSTRACT

A cleaning water production system in which pure water from a primary pure water production system is treated in a subsystem to produce ultrapure water, which is then sent to points of use through supply pipes, the point of use being connected to the subsystem through return pipes for returning unused cleaning water to the subsystem, wherein an extra-ultrapure water production system is provided at a distal end portion of the supply pipes near the point of use for supplying extra-ultrapure water to the points of use.

10 Claims, 4 Drawing Sheets

CLEANING WATER PRODUCTION SYSTEM

This application is a continuation of application Ser. No. 08/361,162 filed Dec. 21, 1994, now abandoned, which is a continuation of application Ser. No. 08/066,304, filed May 24, 1993, now abandoned.

BACKGROUND OF THE INVENTION

1. Field of the Art

The present invention relates to a cleaning water production system and, more particularly, to a system for producing cleaning water used in the production of semiconductors, chemicals, foods, etc., particularly in the production of megabit-class semiconductors.

2. Prior Art

A large amount of high-purity cleaning water is used in the production of semiconductors, chemicals, foods, etc. Particularly, in the production of semiconductors, water of an extremely high degree of purity is used for cleaning in photoetching and other processes. In this case, cleaning water must have an extremely high degree of purity, generally called "ultrapure water", so as not to contaminate the semiconductors.

Cleaning water used in a conventional semiconductor manufacturing process has heretofore been produced as follows.

As shown in FIG. 5, city water 1 is treated in a primary pure water production system 2 to produce pure water 3, and the pure water 3 is further purified in a subsystem 4 to produce ultrapure water 5, which is supplied to each point of use 12p, 12q, 12r, 16p, 16q, 16r, 17p, 17q, 17r through a supply main pipe 6, supply subpipes 7a, 7b, 7c and supply branch pipes 13p, 13q, 13r . . . In this ultrapure water production system, the amount of ultrapure water produced in the subsystem 4, that is, the feed rate of ultrapure water, is constant at all times, and ultrapure water remaining unused at the points of use is returned to the subsystem 4 through return branch pipes 13p, 13q, 13r . . ., return subpipes 14a, 14b, 14c and a return main pipe 15 as return water. The reason for this is that the quality of ultrapure water is degraded even by a slight amount of impurities, which may liquate from the supply pipes even when the supply pipes are produced from a high-purity material. Therefore, if the supplied ultrapure water 5 is allowed to reside in the supply pipes when it is not used at the points of use as in the case of ordinary tap water, the purity of the ultrapure water is immediately lowered due to impurities liquating from the supply pipes, resulting in water unfit for use as ultrapure water. For this reason, it is necessary to keep ultrapure water flowing through the supply pipes at all times regardless of use. Pure water having a lowered level of purity due to its flowing through the return pipes returns to the subsystem 4 where it is repurified before being supplied to the supply pipes.

When city water is used, the above-described primary pure water production system 2 is generally constructed of an activated carbon filter, a deaerator, a reverse osmosis membrane, and an ion exchanger. When lake water or river water is used, the primary pure water production system also employs a coagulo-setting filter.

In general, the above-described subsystem 4 is a system in which pure water treated in the primary pure water production system is further treated to produce water of a high degree of purity, that is, ultrapure water, by using an ultraviolet sterilizer, an ion exchanger, and an ultrafiltration membrane.

Incidentally, in the semiconductor manufacturing field, as technology advances, the integration of LSIs has become increasingly high, i.e., from 16-megabit LSIs to 64-megabit LSIs and further to 256-megabit LSIs, and concurrently cleaning water having a higher degree of purity has been demanded. Accordingly, the process for producing such LSIs requires the use of cleaning water having an extremely low content of dissolved ions and oxygen and containing an extremely small number of solid particles and bacteria. Thus, cleaning water used in the semiconductor manufacturing process must be extra-ultrapure water, which is higher in purity than the conventionally used ultrapure water.

As a result of the advancement of the technique for producing ultrapure water, an extra-ultrapure water production system capable of supplying extra-ultrapure water that is higher in purity than ultrapure water has been developed. However, the purity of extra-ultrapure water is lowered due to impurities liquating from supply pipes during its flow therethrough, as described above.

The above-described problems could be eliminated by supplying extra-ultrapure water without using supply pipes or making the length of the supply pipes extremely short. That is, it may be a solution to the problems to provide an extra-ultrapure water production system capable of obtaining extra-ultrapure water from city water at each point of use. However, in a semiconductor manufacturing factory, where human contact should be avoided as much as possible, it is impossible to provide an extra-ultrapure water production system at each point of use from the viewpoint of the arrangement and management of the system.

SUMMARY OF THE INVENTION

It is, therefore, an object of the present invention to provide a cleaning water production system which is designed so that extra-ultrapure water can be obtained at a point of use or at a position which is as proximate as possible.

It is another object of the present invention to minimize the amount of return water from a point of use to thereby reduce the load on the cleaning water production system, particularly a subsystem thereof.

According to the present invention, ultrapure water that is supplied from the subsystem through the supply pipe in the above-described cleaning water production system is further treated to produce extra-ultrapure water at a point of use or at a position which is as proximate as possible, and the extra-ultrapure water is supplied to the point of use, thereby enabling extra-ultrapure water to be used as cleaning water, and thus attaining the above-described objects.

More specifically, the present invention attains the above-described objects by the following means:

(1) A cleaning water production system in which pure water from a primary pure water production system is treated in a subsystem to produce ultrapure water, which is then sent through supply pipes to points of use, which is connected to the subsystem through return pipes for returning unused cleaning water to the subsystem, characterized in that an extra-ultrapure water production system is provided at the distal end portion of the supply pipes, near the points of use for supplying extra-ultrapure water to the points of use.

(2) A cleaning water production system as stated in (1), wherein the extra-ultrapure water production system include a device for automatically controlling the amount of extra-ultrapure water produced in accordance with the amount of extra-ultrapure water used at the points of use.

The primary pure water production system used in the cleaning water production system of the present invention may be one which has been conventionally used, such as that described above. The subsystem may also be one which has been conventionally used. The subsystem is employed to produce ultrapure water.

The extra-ultrapure water production system used in the present invention produces extra-ultrapure water of a quality necessary for the production of LSIs of high integration such as those mentioned above. With regard to the arrangement of the extra-ultrapure water production system, the present applicant has already completed it and applied for a patent there for (Japanese Patent Application No. 47778/92). Consequently, the extra-ultrapure water production system produced by the present applicant should be used. The feature of present invention resides in the manner of incorporating the extra-ultrapure water production system into the cleaning water production system. As a specific example of the extra-ultrapure water production system, a system such as that shown in FIG. 2 (described later) may be used. The arrangement thereof will be explained in brief. The extra-ultrapure water production system purifies ultrapure water having a lowered degree of purity due to its flowing from the subsystem through the supply pipes, to thereby produce extra-ultrapure water.

The extra-ultrapure water production system is installed as close to a point of use as possible. The extra-ultrapure water production system is provided near the distal end of the supply pipes to send extra-ultrapure water to two or more points of use. Such points of use supplied with the extra-ultrapure water must be within a range in which the purity of extra-ultrapure water remains at an extremely high level.

Further, it is preferable in the extra-ultrapure water production system for the amount of water returned to the subsystem from the extra-ultrapure water production system to be minimized, so as to reduce the load on the extra-ultrapure water production system. This is achieved by controlling the amount of extra-ultrapure water produced therein to be as close to the amount of extra-ultrapure water required at the points of use as possible.

As used herein, ultrapure water is water having a degree of quality as shown in Table 1 hereinafter and extra-ultrapure water is water having a degree of quality shown in Table 2 hereinafter.

The above and other objects, features and advantages of the present invention will become more apparent from the following description when taken in conjunction with the accompanying drawings in which a preferred embodiment of the present invention is shown by way of illustrative examples.

PREFERRED EMBODIMENT OF THE INVENTION

Figure 1:
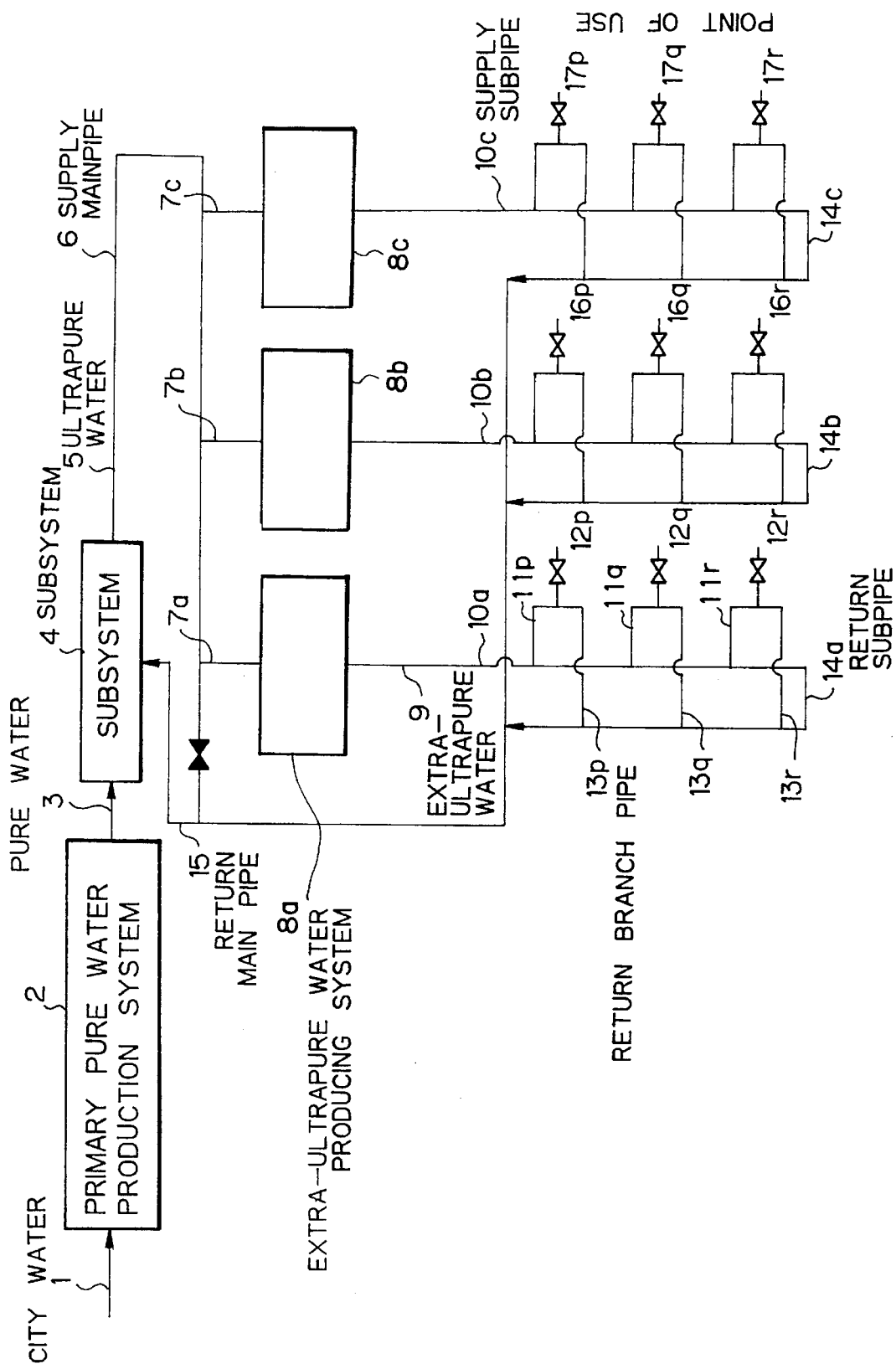
FIG. 1 is a view schematically showing one embodiment of the cleaning water production system of the present invention.

An embodiment of the cleaning water production system of the present invention will be described below with reference to the accompanying drawings. Referring to FIG. 1, city water 1 is purified in a primary pure water production system 2 to become pure water 3, which is further purified in a subsystem 4 to become ultrapure water 5. The ultrapure water 5 passes through a supply main pipe 6 and then passes through a plurality of supply subpipes 7a, 7b and 7c to enter a plurality of extra-ultrapure water production systems 8a, 8b and 8c where it is purified to an extremely high level. The resulting extra-ultrapure water 9 is sent to point of use through supply subpipes 10a, 10b and 10c. For example, in the case of the supply subpipe 10a, the extra-ultrapure water 9 is sent to points of use 12p, 12q and 12r through respective supply branch pipes 11p, 11q and 11r. Each point of use is provided with a valve. Return branch pipes 13p, 13q and 13r are connected to the respective points of use to return unused extra-ultrapure water to the subsystem 4 through a return subpipe 14a and a return main pipe 15. The returned water is repurified in the subsystem 4 so as to be recirculated. The same is true with respect to the other supply subpipes 10b and 10c. It should be noted that two other groups of points of use 16p, 16q and 16r and 17p, 17q and 17r are connected to the other extra-ultrapure water production systems 8b and 8c, respectively.

Figure 2:
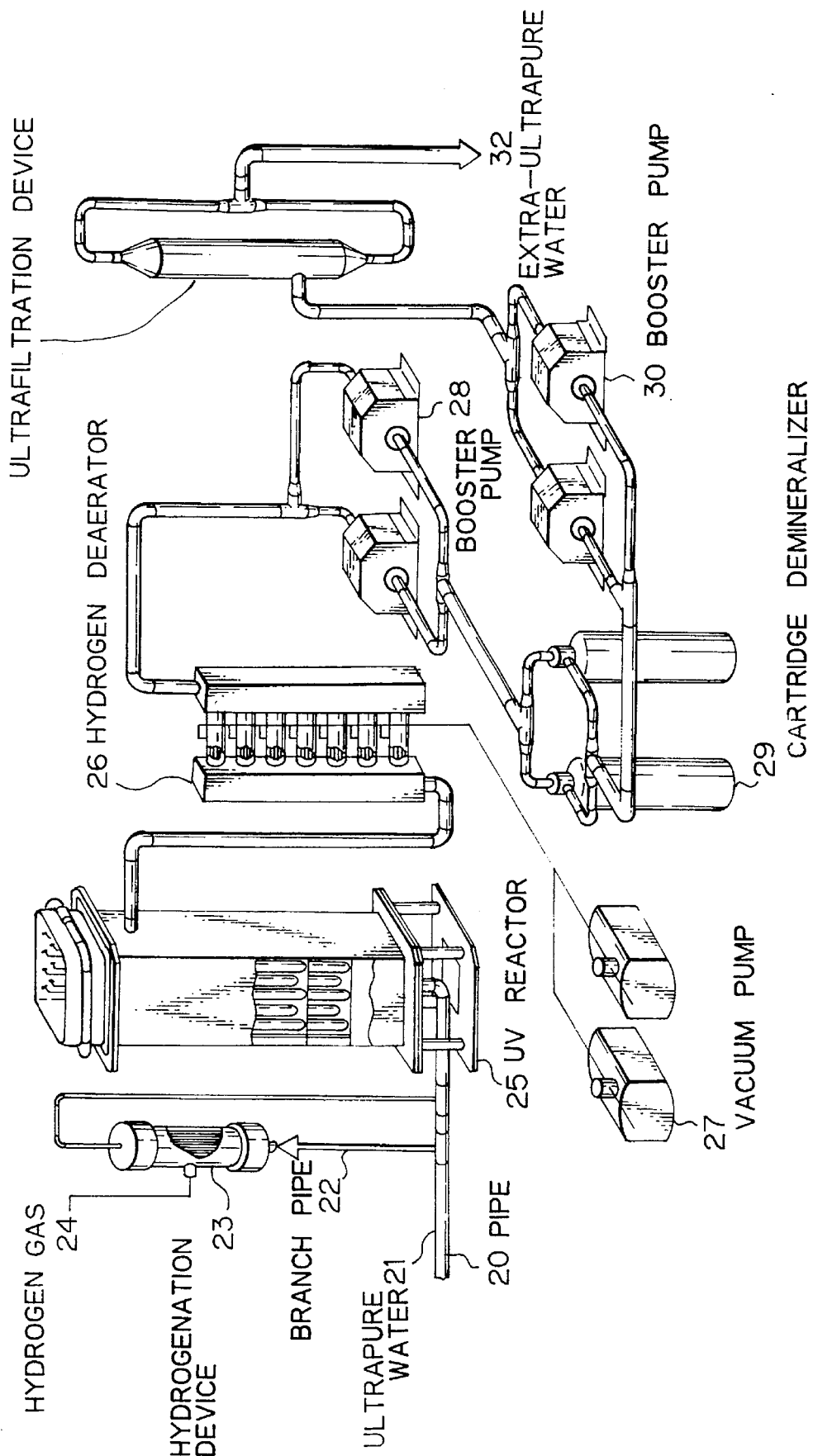
FIG. 2 is a view schematically showing one example of an extra-ultrapure water production system employed in the cleaning water production system shown in FIG. 1.

One example of the extra-ultrapure water production system is shown in FIG. 2. Referring to FIG. 2, which is a schematic view, ultrapure water 21 from the subsystem (not shown) is sent through a pipe 20, and part of the ultrapure water 21 enters a hydrogenation device 23 through a branch pipe 22. In the hydrogenation device 23, hydrogen gas 24 is supplied to one side of a hydrogenating membrane, while the ultrapure water flows through the other side of the membrane. Thus, the hydrogen gas dissolves in the ultrapure water by way of the hydrogenating membrane. The ultrapure water having the hydrogen gas dissolved therein returns to the pipe 20 and joins water therein. Then, the ultrapure water enters the UV reactor 25 where it is irradiated with ultraviolet radiation to cause the dissolved hydrogen to react with other impure components. In this case, the hydrogen mainly reacts with the dissolved oxygen and other oxidizing components to reduce the content of impurities, particularly oxygen, which is deleterious to the production of semiconductors.

The ultrapure water coming out of the UV reactor 25 enters a hydrogen deaerator 26 where excess hydrogen dissolved in the ultrapure water is released. The hydrogen deaerator 26 has a hydrogen deaerating membrane. One side of the membrane is reduced in pressure by a vacuum pump 27 to release the dissolved hydrogen gas from the ultrapure water passing through the other side of the membrane, thereby removing the hydrogen gas. The ultrapure water discharged from the hydrogen deaerator 26 is raised in pressure by a booster pump 28 and thereafter adsorptively purified in a cartridge demineralizer 29. The water passing through the cartridge demineralizer 29 is further raised in pressure by a booster pump 30 and then ultra-filtered through an ultrafiltration device 31 to obtain extra-ultrapure water 32.

The above-described extra-ultrapure water production system is placed near points of use. Thus, it is possible to provide a cleaning water having an extremely high degree of purity.

Figure 3:
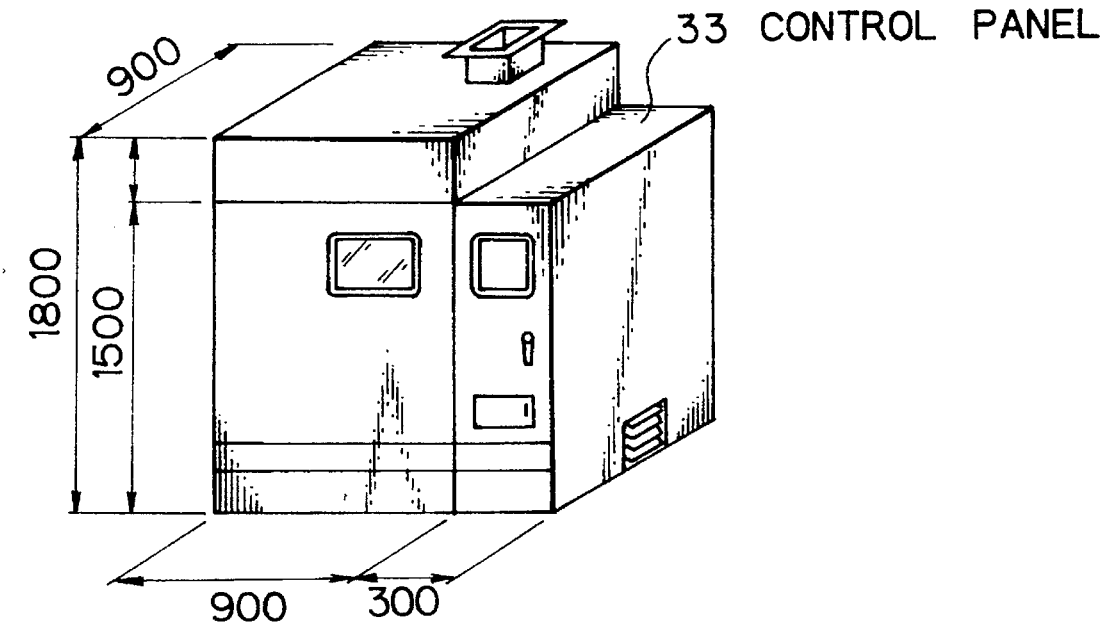
FIG. 3 is a perspective view of a standard machine having a throughput capacity of 5 m³/h and formed by incorporating a cleaning water production system of the present invention.
Figure 4:
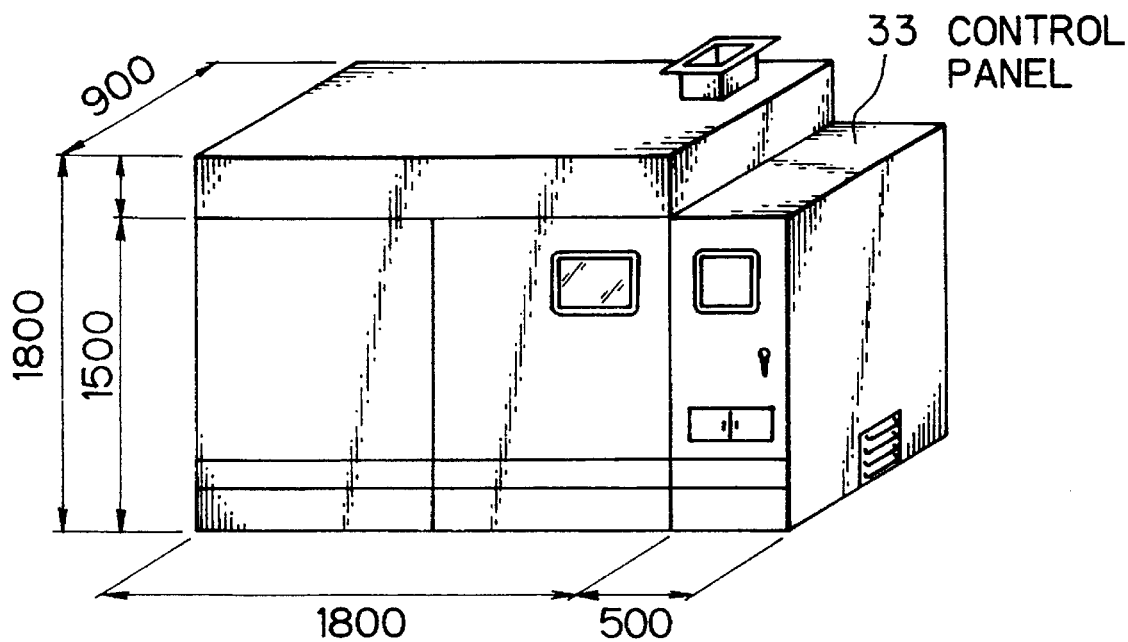
FIG. 4 is a perspective view of a standard machine having a throughput capacity of 10 m³/h and formed by incorporating a cleaning water production system of the invention.
Figure 5:
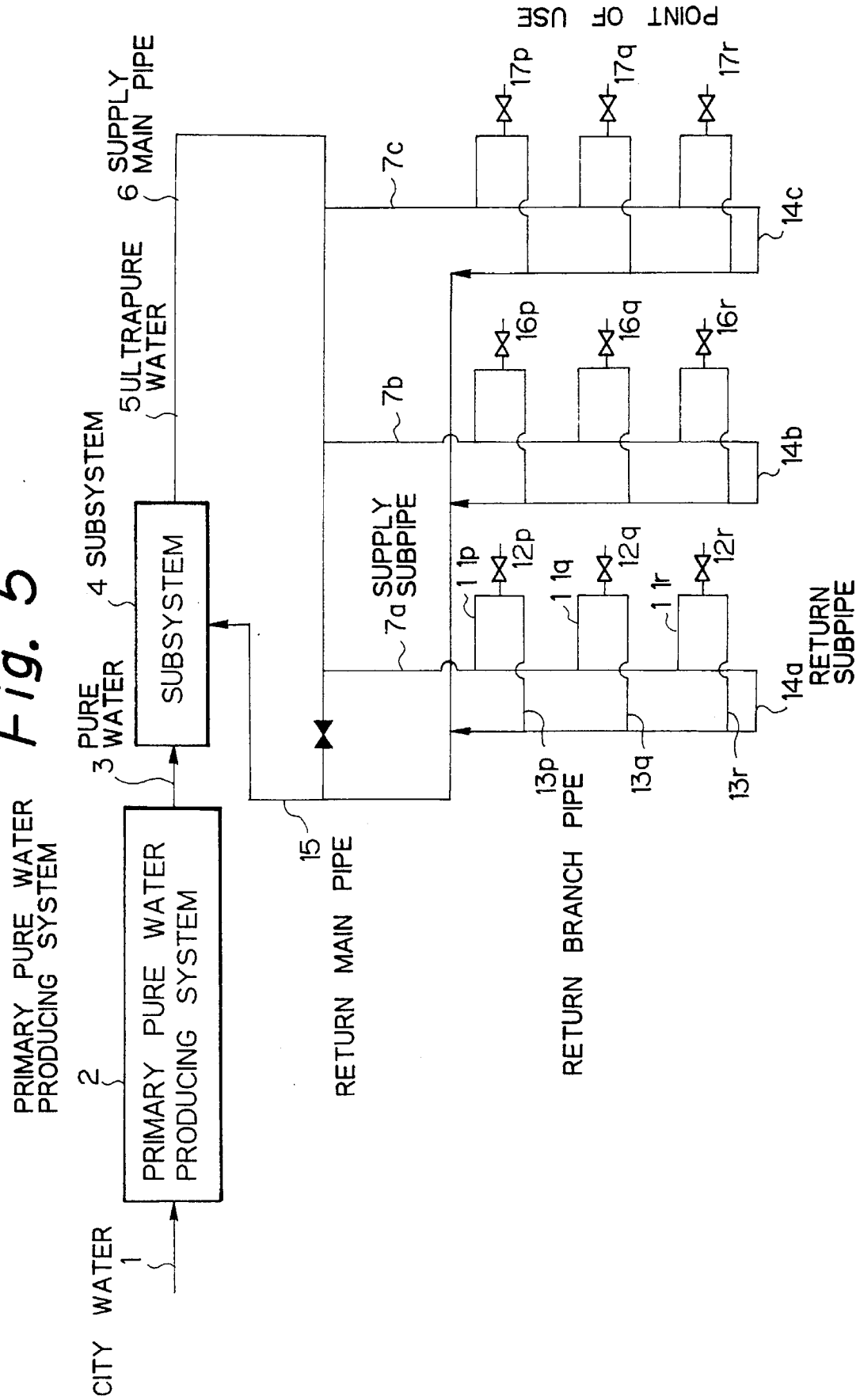
FIG. 5 is a view schematically showing a conventional cleaning water production system for the production of semiconductors.

Specific examples of standard equipment used as the extra-ultrapure water production system in the present invention are shown in FIGS. 3 and 4. FIG. 3 shows a standard machine having a throughput capacity of 5 m³/h, while FIG. 4 shows a standard machine having a throughput capacity of 10 m³/h. The unit of each dimension is mm. A part provided at the right-hand end of each machine is a control panel 33. It will be understood from the sizes of these machines that the extra-ultrapure water production system of the present invention is sufficiently compact to be installed proximate to points of use in a semiconductor manufacturing factory.

A method of controlling the flow rate of ultrapure water in the present invention will be explained below by taking as an example one group of points of use supplied with extra-ultrapure water from an extra-ultrapure water production system provided in the cleaning water production system shown in FIG. 1. The extra-ultrapure water production system 8a in FIG. 1 supplies cleaning water comprising extra-ultrapure water to the points of use 12p, 12q and 12r. Assuming that the maximum amounts of extra-ultrapure water used at the points of use are $Q_1$, $Q_2$ and $Q_3$, the amount of extra-ultrapure water supplied from the extra-ultrapure water production system 8a may be expressed as follows:

$$Q=Q_1+Q_2+Q_3+\alpha$$

(where α: allowance)

When no cleaning water is used at the point of use 12p, a signal from the point 12p is transmitted to a controller to reduce the number of revolutions of a DC motor type centrifugal pump (non-particle type) in the extra-ultrapure water production system 8a. Consequently, the flow rate of feed water to the points of use decreases, and at the same time, the flow rate of return water from the points of use also decreases. When cleaning water is intermittently used at a point of use in a short cycle, a timer is installed in the system to prevent hunting of the flow rate.

If all the points of use 12p, 12q and 12r are not used, the flow rate of return water is controlled so that the flow velocity in the piping is about 1 m/sec. with a view to preventing generation of impurities. The flow velocity is determined to such a value at which extra-ultrapure water maintains its required degree of purity so that when use of cleaning water again begins at a point of use, extra-ultrapure water of sufficiently high purity is supplied to that point of use.

The above-described control is similarly carried out for the other extra-ultrapure water production systems 8b and 8c. Thus, the feed rate at the subsystem 4 can also be controlled without the need for a control valve.

According to the present invention, since an extra-ultrapure water production system is provided near a point of use, ultrapure water from the subsystem can be purified to produce extra-ultrapure water of an extremely high degree of purity at the distal end portion of the supply pipes, which are remote from the subsystem of the cleaning water production system, and the extra-ultrapure water can be immediately supplied to a point of use. Accordingly, even if the purity of ultrapure water is lowered at the distal end portion of the supply pipes, extra-ultrapure water can be supplied as cleaning water to the point of use. In addition, it is possible to minimize the amount of return water from the points of use by providing the extra-ultrapure water production system with a function for automatically controlling the amount of extra-ultrapure water produced in accordance with the amount of extra-ultrapure water required at the points of use.

The present invention will be described below more specifically by way of one example. However, the present invention is not necessarily limited to the example.

EXAMPLE

In the cleaning water production system shown in FIG. 1, a standard machine having a throughput capacity of 5 m³/h, as shown in FIG. 3, was provided as the extra-ultrapure water production system 8a at the distal end portion of the supply subpipe 7a, which was remote from the subsystem 4, and three points of use, which were close to the subsystem, were connected to the extra-ultrapure water production system 8a. Ultrapure water supplied to the extra-ultrapure water production system 8a had an inlet water quality as shown in Table 1. The ultrapure water was purified by the system to become extra-ultrapure water having an outlet water quality as shown in Table 2. At the points of use, the extra-ultrapure water was sufficiently usable as cleaning water required for 16 megabit-class semiconductors.

TABLE 1

| Inlet Water Quality | |
|---|---|
| Items | Numerical values |
| Resistivity (MΩ · cm) | 17.0< |
| DO (μg/l) | <100 |
| TOC (μg/l) | <30 |
| Micro-organisms (organisms/l) | <50 |
| Particles (particles/ml) (larger than 0.07 μm) | <200 |
| $SiO_2$ (μg/l) | <30 |

TABLE 2

| Outlet Water Quality | |
|---|---|
| Items | Numerical values |
| Resistivity (MΩ · cm) | 18.1< |
| DO (μg/l) | <5 |
| TOC (μg/l) | <5 |
| Micro-organisms (organisms/l) | <1 |
| Particles (particles/ml) (larger than 0.07 μm) | <1 |
| $SiO_2$ (μg/l) | <1 |

As described above, according to the present invention, since an extra-ultrapure water production system is provided near points of use, ultrapure water can be purified to produce extra-ultrapure water of high purity at the distal end portion of the supply pipes, which are remote from the subsystem of the cleaning water production system, and the extra-ultrapure water can be immediately supplied to the points of use. Accordingly, there is no likelihood of the purity of the extra-ultrapure water being lowered before it reaches the points of use, and it is possible to provide cleaning water having an extremely high degree of purity at the points of use. Therefore, the present invention is suitable for use in the production of high integration semiconductors. Extra-ultrapure water that is obtained by the present invention can also be effectively used in fields other than the semiconductor industry.

In addition, it is possible to minimize the amount of extra-ultrapure water produced in the extra-ultrapure water production system and also possible to minimize the amount of return water from the points of use by providing the extra-ultrapure water production system with a function for automatically controlling the amount of extra-ultrapure water produced in accordance with the amount of extra-ultrapure water required at the points of use. Accordingly, the load on the subsystem can be reduced.

What is claimed is:

1. A cleaning water production system in which pure water from a primary pure water production system is treated in a subsystem to produce ultrapure water, which is then sent to points of use through supply pipes, said points of use being connected to said subsystem through return pipes for returning unused cleaning water to said subsystem, wherein an extra-ultrapure water production system is provided at a distal end portion of said supply pipes near said points of use for supplying extra-ultrapure water to said points of use, said extra-ultrapure water production system including means for automatically controlling an amount of extra-ultrapure water produced in accordance with an amount of extra-ultrapure water used at said points of use, said means for automatically controlling said extra-ultrapure water production system receives a signal from said point of use for controlling the number of revolutions of a pump in said extra-ultrapure water production system and controls the flow rate of said cleaning water returning to said subsystem to a reduced constant value when all of said points of use are not used.

2. A cleaning water production system according to claim 1, wherein said supply pipes comprise a supply main pipe connected to said subsystem and a supply subpipe connected to a distal end portion of said supply main pipe, said extra-ultrapure water production system being provided in said supply subpipe.

3. A cleaning water production system according to claim 1, wherein said supply pipes comprise a supply main pipe connected to said subsystem, a supply subpipe connected to a distal end portion of said supply main pipe and a plurality of supply branch pipes each connected between said supply subpipe and one of said points of use, said extra-ultrapure water production system being provided in said supply subpipe.

4. A cleaning water production system according to claim 1, wherein said supply pipes comprise a supply main pipe connected to said subsystem and a plurality of supply subpipes connected to a distal end portion of said supply main pipe, said extra-ultrapure water production system being provided in each of said supply subpipes.

5. A cleaning water production system according to claim 1, wherein said supply pipes comprise a supply main pipe connected to said subsystem, a plurality of supply subpipes connected to a distal end portion of said supply main pipe and a plurality of supply branch pipes each connected between one of said supply subpipes and one of said points of use, said extra-ultrapure water production system being provided in each one of said supply subpipes.

6. A cleaning water production system according to claim 1, wherein said return pipes comprise a return main pipe connected to said subsystem, a plurality of return subpipes each connected to said return main pipe and a plurality of return branch pipes each connected between one of said return subpipes and one of said points of use.

7. A cleaning water production system according to claim 1, wherein said primary pure water production system comprises an activated carbon filter, a deaerator, a reverse osmosis membrane and an ion exchanger.

8. A cleaning water production system according to claim 1, wherein said primary pure water production system comprises an activated carbon filter, a deaerator, a reverse osmosis membrane, an ion exchanger and a coagulo-setting filter.

9. A cleaning water production system according to claim 1, wherein said subsystem comprises an ultraviolet sterilizer, an ion exchanger and an ultrafiltration membrane.

10. A cleaning water production system according to claim 1, wherein said extra-ultrapure water production system comprises a hydrogeneration device for dissolving hydrogen gas into said ultrapure water from said subsystem, a UV reactor for irradiating said ultrapure water containing said hydrogen gas with ultraviolet radiation, a hydrogen deaerator for releasing excess hydrogen gas dissolved in said ultrapure water, a cartridge demineralizer and an ultrafiltration device.

* * * * *